United States Patent
Gimeno Monge et al.

(10) Patent No.: US 9,312,922 B2
(45) Date of Patent: Apr. 12, 2016

(54) NFC SYSTEM COMPRISING A PLURALITY OF SECURE ELEMENTS

(71) Applicant: ST-Ericsson SA, Plan-les-Ouates (CH)

(72) Inventors: Pablo Ignacio Gimeno Monge, Nice (FR); Javier Del Prado Pavon, Antibes (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/405,218

(22) PCT Filed: Jun. 19, 2013

(86) PCT No.: PCT/EP2013/062704
§ 371 (c)(1),
(2) Date: Dec. 3, 2014

(87) PCT Pub. No.: WO2013/189969
PCT Pub. Date: Dec. 27, 2013

(65) Prior Publication Data
US 2015/0263787 A1    Sep. 17, 2015

Related U.S. Application Data

(60) Provisional application No. 61/668,070, filed on Jul. 5, 2012.

(30) Foreign Application Priority Data

Jun. 21, 2012  (EP) .................................... 12305707

(51) Int. Cl.
*H04B 5/00* (2006.01)
*G06Q 20/32* (2012.01)
*H04W 12/06* (2009.01)

(52) U.S. Cl.
CPC .......... *H04B 5/0031* (2013.01); *G06Q 20/3226* (2013.01); *G06Q 20/3278* (2013.01); *H04B 5/0056* (2013.01); *H04W 12/06* (2013.01)

(58) Field of Classification Search
CPC ..... G06K 19/0723; H04B 5/00; H04B 5/0025; H04B 5/0075
USPC .......... 455/41.1, 41.2, 39; 340/10.1, 10.3, 505
See application file for complete search history.

(56) References Cited

U.S. PATENT DOCUMENTS 8,358,596 B2 * 1/2013 Byme .................. H04W 76/02
                                                      370/255
8,977,195 B2 * 3/2015 Levy .................. G06K 7/10237
                                                      455/41.1

(Continued)

FOREIGN PATENT DOCUMENTS

| EP | 2 106 108 A1 | 9/2009 |
| EP | 2 291 046 A2 | 3/2011 |
| WO | 2009/129535 A2 | 10/2009 |
| WO | 2012/065643 A1 | 5/2012 |

OTHER PUBLICATIONS

International Search Report issued in corresponding International application No. PCT/EP2013/062704, date of mailing Sep. 6, 2013.

(Continued)

*Primary Examiner* — Sonny Trinh
(74) *Attorney, Agent, or Firm* — Patent Portfolio Builders PLLC

(57) ABSTRACT

It is provided a method implemented by an electronic device comprising a near field communication (NFC) system. The system comprises an NFC contactless front end, a plurality of secure element interfaces to which a plurality of secure elements are connected, and a processing unit adapted to control the NFC contactless front end and the plurality of secure elements through the secure element interfaces. The method comprises sending (S10) an initialization command to all the secure elements through the secure element interfaces, upon exposure of the NFC contactless front end to an NFC reader. The method improves the field of near field communication.

10 Claims, 4 Drawing Sheets

(56) References Cited

U.S. PATENT DOCUMENTS

| | | | | |
|---|---|---|---|---|
| 8,989,724 B2* | 3/2015 | Boehler | ............. | G06K 7/10237 455/41.2 |
| 9,064,253 B2* | 6/2015 | Royston | ................ | H04W 4/001 |
| 2015/0106456 A1* | 4/2015 | van Hoek | ................ | H04W 4/12 709/206 |

OTHER PUBLICATIONS

Written Opinion of the International Searching Authority issued in corresponding International application No. PCT/EP2013/062704, date of mailing Sep. 6, 2013.

* cited by examiner

NFC SYSTEM COMPRISING A PLURALITY OF SECURE ELEMENTS

TECHNICAL FIELD

The invention relates to the field of electronics, and more particularly to a method, an electronic device, a program, and a data storage medium for performing near field communication (NFC).

BACKGROUND

NFC systems are expected to be integrated in next generation mobile phones. Typical NFC is a short range radio technology based on the inductive coupling of two loop antennae resonating at 13.56 MHz. Typical data rates are in the range of 106 to 424 Kbps, and communication distance is in the range of several centimeters. Typical applications include secure transactions for payment and ticketing. Secure NFC applications require the addition to the system of one or more Secure Elements (SE) to hold sensitive information (e.g. Credit Card numbers, transportation system subscriptions).

Contactless RFID systems, the ancestors of NFC systems, comprise a single application, stored in a single SE, contained in the same device performing the RFID radio communication. First NFC devices are standalone NFC chips with at least one SE (comprised in the NFC device or externally accessible through a dedicated interface), supporting at least one secure application. Standards defining interfaces and protocols giving access to SEs as standalone devices are emerging (ETSI 102613/102622), restricted for the time being to single SE systems. Proprietary interfaces are also used to access SEs.

SUMMARY

The invention aims at improving the field of NFC.

This object is achieved with a method implemented by an electronic device comprising an NFC system. The system comprises an NFC contactless front end, a plurality of secure element interfaces to which a plurality of secure elements are connected, and a processing unit adapted to control the NFC contactless front end and the plurality of secure elements through the secure element interfaces. The method comprises sending an initialization command to all the secure elements through the secure element interfaces, upon exposure of the NFC contactless front end to an NFC reader.

This object is also achieved with an electronic device comprising an NFC system. The system comprises an NFC contactless front end, a plurality of secure element interfaces adapted to connect a plurality of secure elements (wherein a plurality of secure elements may or may not be actually connected to the secure element interfaces), and a processing unit adapted to control the NFC contactless front end and the plurality of secure elements through the secure element interfaces. The device is adapted to perform the above method. The device may be a mobile communication device.

This object is also achieved with a computer program comprising instructions for performing the above method.

This object is also achieved with a data storage medium having recorded thereon the above program.

The invention offers many advantages, including the following:

Thanks to the NFC system, the electronic device may conveniently be used for performing NFC.

The device may have a plurality of secure elements connected thanks to the plurality of interfaces, which makes the device more convenient than other devices comprising a single secure element interface.

Because the method comprises, upon exposure of the NFC contactless front end to an NFC reader, sending the initialization command to all the secure elements rather than a single one, access to the requested application is performed relatively fast although the device comprises a plurality of secure elements, and without requirement of a plurality of NFC contactless front ends (e.g. one per secure element).

Further features and advantages of the invention will appear from the following description of embodiments of the invention, given as non-limiting examples, with reference to the accompanying drawings listed hereunder.

DETAILED DESCRIPTION

Figure 1:
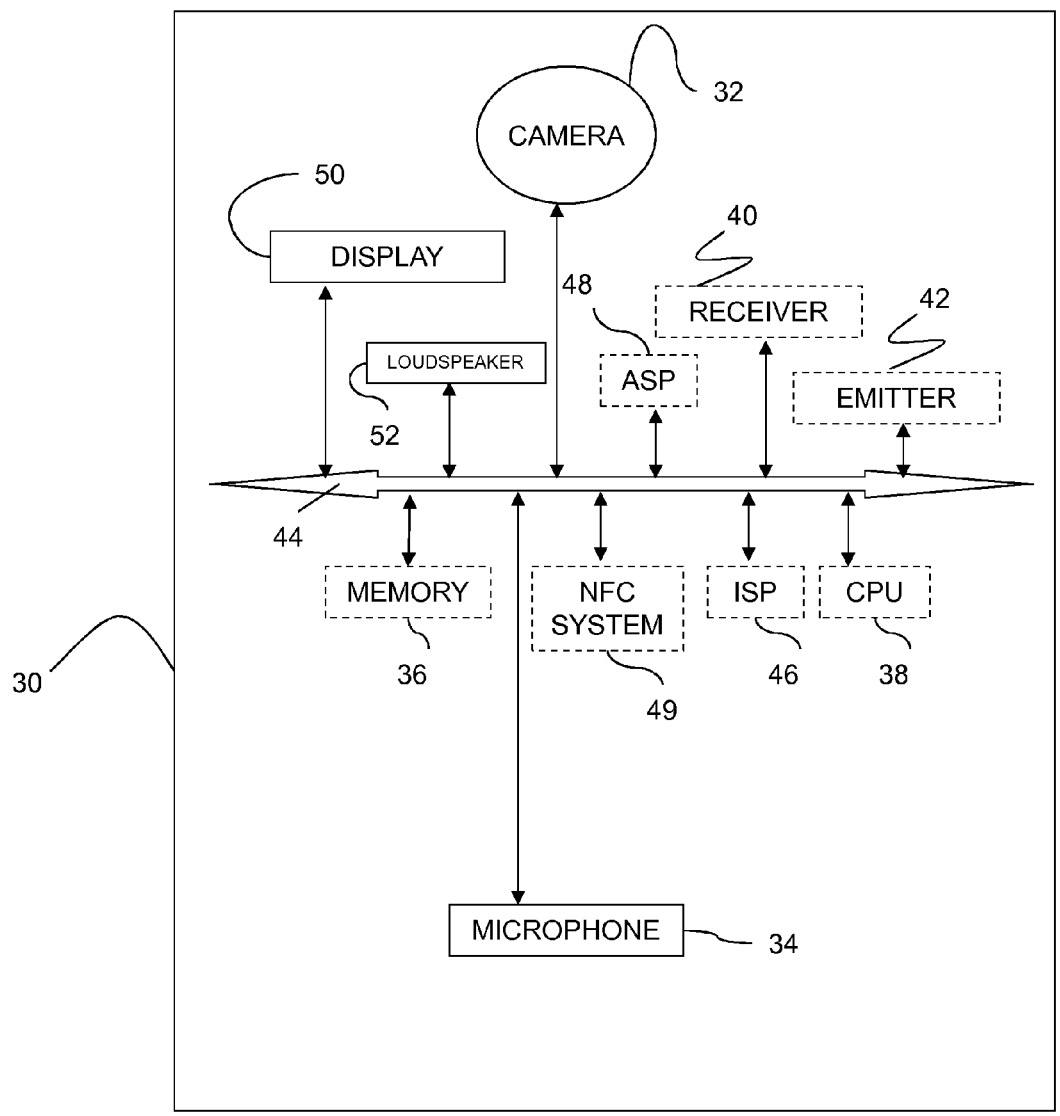
FIG. 1 shows a schematic representation of an example of the electronic device.

The method may be performed based on a computer program comprising instructions for performing the method, e.g. by reading the instructions by a processing unit (i.e. a processor). The program may be executable on a programmable device (i.e. the electronic device). The application program may be implemented in a high-level procedural or object-oriented programming language, or in assembly or machine language if desired. In any case, the language may be a compiled or interpreted language. The program may be a full installation program, or an update program. In the latter case, the program is an update program that updates a programmable device, previously programmed for performing parts of the method, to a state wherein the device is suitable for performing the whole method.

The program may be recorded on a data storage medium. The data storage medium may be any memory adapted for recording computer instructions. The data storage medium may thus be any form of nonvolatile memory, including by way of example semiconductor memory devices, such as EPROM, EEPROM, and flash memory devices; magnetic disks such as internal hard disks and removable disks, magneto-optical disks, and CD-ROM disks.

A device suitable for performing the method may be an electronic device comprising hardware memory, including volatile and/or non volatile memory, and having recorded thereon the program. The memory may store any other information used by the method. The memory is accessible by at least one processor, e.g. a Central Processing Unit (CPU) of the device. The processor may execute the program and may thereby perform the method, without further programming of the device.

The device comprises an NFC system suited for performing NFC with the device. The system comprises an NFC contactless front end, which is an interface for performing NFC with another device, such as an NFC reader. The NFC contactless front end may comprise a radio module for receiving and/or emitting an NFC signal. The NFC contactless front end may comprise (or be coupled to) a processing unit, possibly the CPU mentioned above. The system may comprise a single NFC contactless front end. Thus, the device may be easy and cheap to construct and take less space.

The system comprises a plurality of (i.e. at least two) secure element interfaces adapted to connect a plurality of secure elements (i.e. one secure element per interface). As known per se, secure elements are pieces of hardware connectable to the system and holding data (e.g. on a memory) which may be communicated via NFC in a secure way (e.g. respecting any standard security requirement). A secure element may comprise a processor and a memory, as well as an application, i.e. a piece of software running inside the secure element, the application being accessible by an NFC reader via NFC in a secure way. Typical secure elements are SIM cards and SD cards. The interfaces comprise a hardware part and a software part, which may be as known in the art, e.g. according to the ETSI 102613 and/or ETSI 102622 standards. Having at least one or at least two of the interfaces follow one or both of the above standards is particularly convenient for connecting a plurality of secure elements to the device.

The NFC system further comprises a processing unit adapted to control the NFC contactless front end and the plurality of secure elements through the secure element interfaces. In other words, the processing unit is in communication with the NFC contactless front end, e.g. to receive incoming signals from an NFC reader and channelled by the contactless front end, and with the secure elements which are connected to the interfaces, e.g. to make the secure elements perform actions such as data exchange.

In an example, the device may further comprise audio convertors and transducers, such as digital to analog convertor (DAC) and a loudspeaker. In such a case, the device may play the numeric audio signal. The device may further comprise a user graphical interface, such as a sensitive screen or a screen and keyboard.

The device may be a communication device. The device may thus comprise a signal emitter and a signal receiver. For example, the device may be a telephone. The device may be a wireless communication device. The device may be mobile (i.e. transportable). The device may for example be a mobile phone (e.g. a cell phone).

It is referred to FIG. 1 which shows a block diagram representing an example of a mobile electronic device 30, which may be a mobile phone, suitable for implementing the method.

In the example, device 30 may be used for capturing audio and image data. For this, device 30 comprises camera 32 and microphone 34 for respectively capturing image and audio data. Device 30 also comprises memory 36 which may comprise volatile and non-volatile memory (not distinguished on the figure). Memory 36 may be divided in several compartments, possibly physically apart in device 30. Memory 36 stores, recorded thereon, instructions for performing the method, possibly already compiled or pre-compiled. Device 30 also comprises processors including CPU 38, Image Signal Processor 46 (ISP) and Audio Signal Processor 48 (ASP). These processors access data through bus 44, process the data and circulate the data through the bus 44. Of course, fewer than three processors may physically be embodied, e.g. if one processor accomplishes all computations. On the other hand, more than three processors may physically be embodied, e.g. in the case of parallel processing. Device 30 also comprises display 50 and loudspeaker 52 for outputting data, i.e. for respectively displaying image data and playing audio data. Device 30 also comprises receiver 40 and emitter 42, which are for communicating with the exterior e.g. with other devices, e.g. if device 30 is a cellular phone.

Device 30 also comprises NFC system 49. For example, device 30 may be exposed to an NFC reader (not represented). Upon such exposure, the processor of NFC system 49 (not represented on the figure) sends an initialization command to all the secure elements through the secure element interfaces (not represented either).

Figure 2:
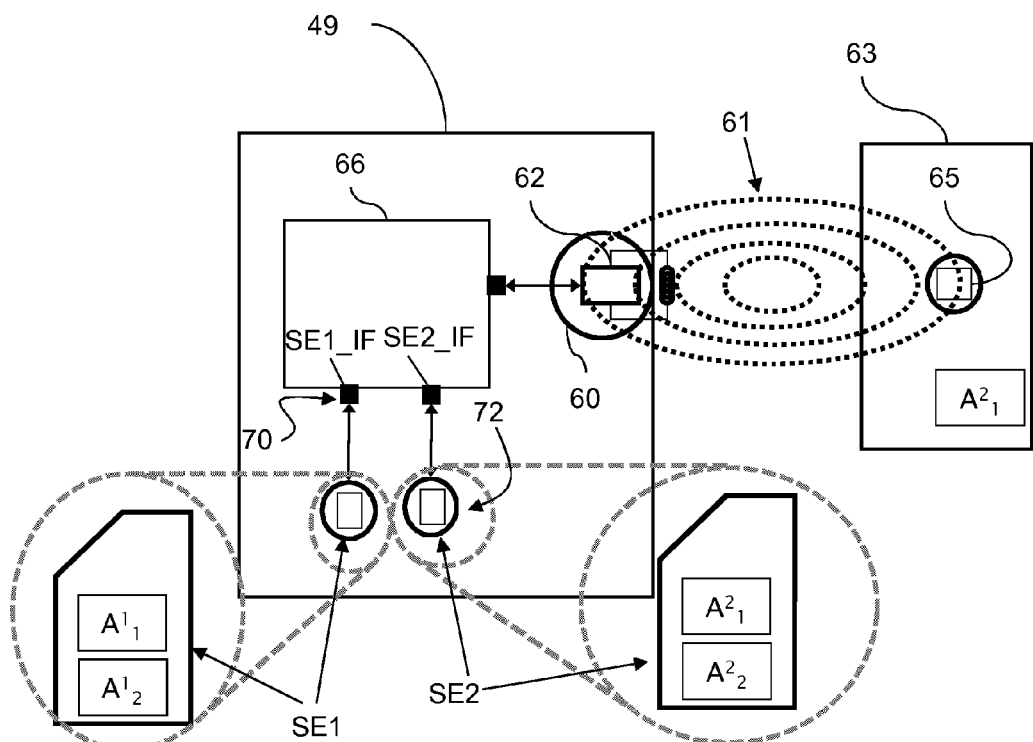
FIG. 2 shows a schematic representation of an example of an NFC system.

FIG. 2 shows a schematic representation of an example of NFC system 49 of FIG. 1, which may be used in any other electronic device.

NFC system 49 comprises NFC contactless front end 62, included in radio station 60 in the example, for performing NFC-type communication represented by dotted lines 61 with NFC reader 63 which also has a radio station 65. NFC system 49 also comprises the plurality 70 of secure element interfaces SE1_IF and SE2_IF connected to the plurality 72 of secure elements SE1 and SE2 (which are represented both as connected to the interfaces 70 and in a detached and enlarged view respectively in the small and larger dotted line circles). The plurality of secure elements may comprise secure elements which are removable and/or secure elements which are permanently mounted in the system (e.g. soldered). NFC system also comprises processing unit 66 which may be a dedicated processing unit or, preferably for resource savings, a CPU of the electronic device. As can be seen on the figure, processing unit 66 is coupled to NFC contactless front end 62 and to the plurality 72 of secure elements (via the interfaces 70), and is thus adapted to control these elements.

FIG. 2 represents a situation where contactless front end 62 of NFC system 49 is exposed to NFC reader 63, which is trying to access application $A^2_1$. Upon such exposure, according to the method implemented by the electronic device comprising NFC system 49, contactless front end 62 indicates to processing unit 66 that it is in the vicinity of an NFC reader, which is NFC reader 63 in this situation, and, optionally, that an attempt to access an application is being made by said NFC reader 63 (at this stage, with or without the precision that it is specifically application $A^2_1$). Upon such indication, processing unit 66 sends (or ensures the sending of) an initialization command to all the secure elements 70 (SE1 and SE2 in the example) through the secure element interfaces 70 (SE1_IF and SE2_IF in the example). The initialization command notifies the secure elements that some NFC activity is going to take place, so that the secure elements can be initialized. The initialization of the secure elements consists of a series of operations made by the secure elements to allow communication between them and the processing unit (e.g. the NFC reader via the processing unit). Notably, the initialization of the secure elements may put the secure elements out of an idle state (in which they were before exposure to the NFC reader) and power up the secure elements. Thus, with only one contactless front end 62, the NFC system ensures the initialization of all the secure elements (both SE1 and SE2), such that application $A^2_1$ may be accessed by NFC reader 63 in a rapid and robust way, with little complexity and low resource consumption.

For the secure elements, initialization may be, as known per se, an interface-dependent two step process: an initialization request, followed by either an acknowledge or a predefined timed availability. The NFC system may then send to the NFC reader a message indicating its availability for execution of an application via NFC (i.e. also called "initial answering message").

Figure 3:
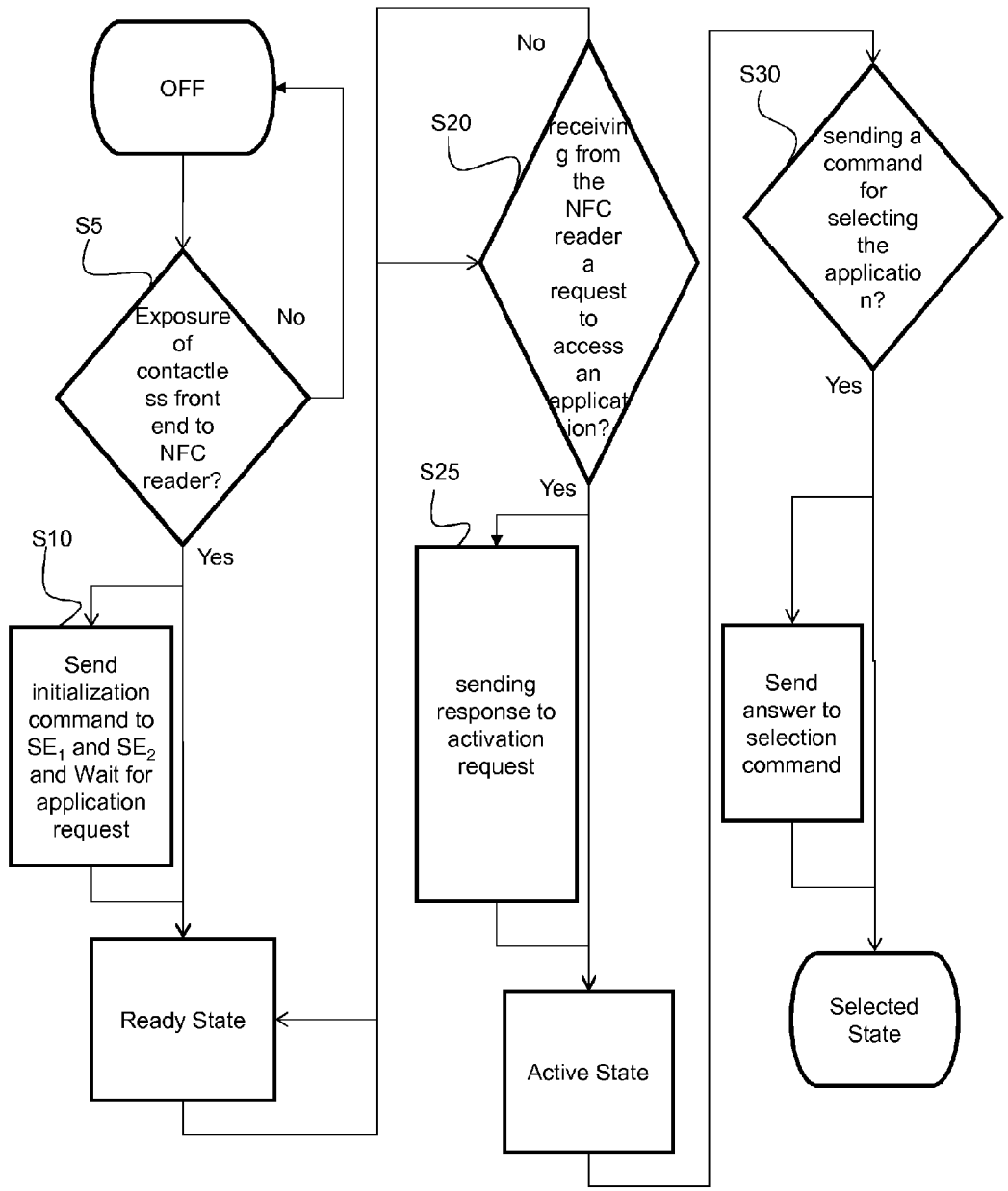
FIG. 3 shows a flowchart of an example of the method.

FIG. 3 shows a flowchart of an example of the method, e.g. performed by any electronic device comprising an NFC system adapted thereto, e.g. the NFC system 49 of FIG. 2, for example device 30 of FIG. 1. The method of the example allows the execution of an application hosted by one of the secure elements in an efficient way.

The method of the example comprises exposing (S5) the contactless front end to the NFC reader. Upon such action, the secure elements are initialized (S20), whereas the secure elements are OFF otherwise (except if they were previously exposed to the NFC reader or another NFC reader).

Once all the secure elements are initialized (i.e. in the "ready state"), the method may comprise receiving (S20) from the NFC reader a request to access an application. The method may then determine the secure element hosting the application. Then, the system may then activate the secure element hosting the application through its secure element interface (except if the secure element was already previously activated). In parallel, the method sends (S25) to the NFC reader a response to the activation request.

Once the secure element hosting the application is activated (i.e. ready for execution of an application on it), the NFC reader in the method of the example sends (S30) a command for selecting the application to the secure element hosting the application. The application may then be executed.

The device and the method thus propose a unified SE access framework that is SE interface agnostic, so that several instances of SEs can be efficiently integrated into an NFC system, by allowing simultaneous SE initialization regardless of the supported interface and protocol. The NFC System initializes all secure elements prior to launching the selection of an application (e.g. before sending the initial answering message to the NFC reader). Initialization is to be carried out and then an activation state is reached, where activation is defined as the state in which a Secure Element is ready to send (receive) data to (from) the applications loaded within. The device and method provide a flexible framework giving access to all applications hosted in several secure elements attached to a NFC system. This is a significant improvement compared with already existing systems.

Figure 4:
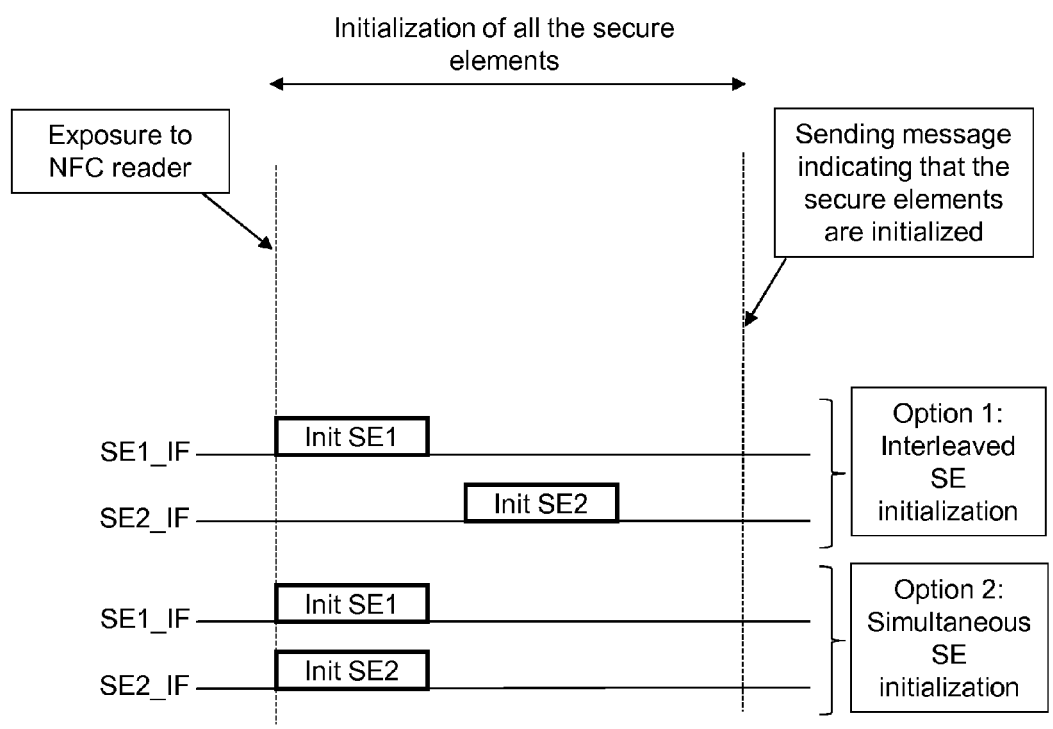
FIG. 4 shows a schematic representation of examples of the initialization step of the method.

Now, referring to FIG. 4 which may apply to the example of FIG. 2 (i.e. an electronic device comprising an NFC system having two secure elements SE1 and SE2 connected through interfaces SE1_IF and SE2_IF), possibly in combination with the example of FIG. 1 and/or the example of FIG. 3, sending an initialization command to all the secure elements may be performed simultaneously or in an interleaved manner (FIG. 4 represents the two options, together with the initialization of the contactless front end). Indeed, the sequence for secure element initialization can be designed in different ways, for instance, all secure elements could be initialized simultaneously (leading to a fast combined initialization time), interleaved one by one (leading to a low power demand), or with a mix or simultaneous and interleaving. In all cases, the goal is the same, that is, to put all secure elements in an initialized state, and that regardless of the interface and protocols used to communicate to the secure element, and regardless of the application(s) loaded within the secure element(s).

The invention claimed is:

1. A method implemented by an electronic device comprising a near field communication (NFC) system, wherein:
   the system comprises:
      an NFC contactless front end,
      a plurality of secure element interfaces to which a plurality of secure elements are connected, and
      a processing unit adapted to control the NFC contactless front end and the plurality of secure elements through the secure element interfaces,
   and the method comprises:
      sending an initialization command to all the secure elements through the secure element interfaces, upon exposure of the NFC contactless front end to an NFC reader.

2. The method of claim 1, wherein sending an initialization command to all the secure elements is performed simultaneously or in an interleaved manner.

3. The method of claim 1, wherein the method further comprises, once all the secure elements are initialized:
   receiving from the NFC reader a request to access an application, and then
   determining and activating the secure element hosting the application,
   sending to the NFC reader a response to the request to access an application.

4. The method of claim 3, wherein the method further comprises, once the secure element hosting the application is activated, receiving a command from the NFC Reader for selecting the application by the secure element hosting the application.

5. An electronic device comprising a near field communication system, wherein the system comprises:
   an NFC contactless front end,
   a plurality of secure element interfaces adapted to connect a plurality of secure elements, and
   a processing unit adapted to control the NFC contactless front end and the plurality of secure elements through the secure element interfaces,
   wherein an initialization command is sent to all the secure elements through the secure element interfaces, upon exposure of the NFC contactless front end to an NFC reader.

6. The device of claim 5, wherein the secure element interfaces comprise at least one or two European Telecommunications Standards Institute interfaces.

7. The device of claim 5, wherein the device further comprises a plurality of secure elements connected to the secure element interfaces.

8. The device of claim 5, wherein the device is a mobile communication device.

9. A non-transitory computer program in a near field communication system, wherein the system comprises:
   an NFC contactless front end,
   a plurality of secure element interfaces adapted to connect a plurality of secure elements, and
   a processing unit adapted to control the NFC contactless front end and the plurality of secure elements through the secure element interfaces,
   wherein the non-transitory computer program comprises instructions for sending an initialization command to all the secure elements through the secure element interfaces, upon exposure of the NFC contactless front end to an NFC reader.

10. A non-transitory data storage medium having recorded thereon the program of claim 9.

* * * * *